(12) United States Patent
Bagley

(10) Patent No.: US 6,874,805 B2
(45) Date of Patent: Apr. 5, 2005

(54) COVER WITH SPRING-BIASED DOOR FOR TRAILER HITCH RECEIVER

(75) Inventor: Wes Bagley, Sandy, UT (US)

(73) Assignee: Uara Services, Auburn, WA (US)

( * ) Notice: Subject to any disclaimer, the term of this patent is extended or adjusted under 35 U.S.C. 154(b) by 0 days.

(21) Appl. No.: 10/236,411

(22) Filed: Sep. 6, 2002

(65) Prior Publication Data

US 2004/0046360 A1 Mar. 11, 2004

(51) Int. Cl.⁷ .............................................. B60D 1/01
(52) U.S. Cl. ..................................................... 280/507
(58) Field of Search ................................. 280/504–507

(56) References Cited

U.S. PATENT DOCUMENTS

| | | | |
|---|---|---|---|
| 4,040,641 A | 8/1977 | Riecke | 280/507 |
| 4,784,610 A * | 11/1988 | Stuart | 439/144 |
| 4,852,902 A | 8/1989 | Young et al. | |
| 5,603,178 A | 2/1997 | Morrison | 40/591 |
| 5,934,699 A | 8/1999 | Blake | 280/507 |
| 6,019,386 A | 2/2000 | Morelock | |
| 6,048,224 A * | 4/2000 | Kay | 439/445 |
| 6,176,506 B1 | 1/2001 | Blake | |
| 6,439,595 B1 * | 8/2002 | Cheng et al. | 280/507 |

* cited by examiner

Primary Examiner—Lesley D. Morris
Assistant Examiner—L. Lum
(74) Attorney, Agent, or Firm—TraskBritt, P.C.

(57) ABSTRACT

A receiver cover includes a stationary member that is configured to be secured to an end of a receiver of a trailer hitch. The receiver cover also includes a door which is hingedly connected to the stationary member. A biasing element, such as a spring, causes the door of the receiver cover to be biased in a closed position over the stationary element of the receiver cover. Thus, when the receiver is not in use, the door automatically closes and is secured in a closed position over a receptacle in a receiver with which the receiver cover is used. When access to the receptacle of the receiver is desired, such as for coupling a trailer hitch therewith, the door may be manually opened against the bias of the biasing element so as to expose the receptacle.

7 Claims, 3 Drawing Sheets

COVER WITH SPRING-BIASED DOOR FOR TRAILER HITCH RECEIVER

BACKGROUND OF THE INVENTION

1. Field of the Invention

The present invention relates generally to receiver covers for receivers of trailer hitches and, more specifically, to receiver covers which facilitate access to the receptacle of a receiver while remaining secured to the outside of the receiver.

2. Background of Related Art

Many vehicles have been equipped with trailer-towing apparatus. For noncommercial vehicles, such as cars and light trucks (e.g., pickup trucks, sport utility vehicles, etc.), such trailer-towing apparatus are typically in the form of a permanent vehicle-mounted portion, which includes a receiver, and a trailer hitch, which is removable and securable to the receiver, such as with one or more cotter pins or the like.

When the trailer hitch is not in use, but remains coupled with a receiver therefor, the trailer hitch may protrude a significant distance from the rear of a vehicle and may cause damage to structures or other vehicles. Also, when trailer hitches remain coupled with their receivers for long periods of time, moisture may become trapped therebetween, which may result in rusting or corrosion of one or both of the trailer hitch and the receiver, which may weaken them.

Even when a trailer hitch is removed from a receiver, the exposed end of the receiver may be somewhat undesirable. For example, an exposed end of a receiver may be unsightly. Also, dust, dirt, road debris, moisture, or combinations thereof may be introduced into the receptacle of the receiver, hindering subsequent use thereof, as well as facilitating corrosion of the receiver.

Various types of receiver covers have been developed to maintain a sightly appearance when a trailer hitch is not coupled with a receiver. Typically, conventional receiver covers include an inner receptacle into which an otherwise exposed end of the receiver is introduced, as well as an outer member which shields the end of the receiver onto which the receiver cover has been installed. Typically, the outer member and inner receptacle are integral with one another or fixedly secured to each other. Accordingly, when access to the receiver is desired, the entire receiver cover must be removed from the receiver and stored elsewhere. This often results in loss of receiver covers, as the storage location may be on the back bumper of the vehicle, on a trailer which has been coupled to the vehicle, or some other unsafe location.

U.S. Pat. No. 6,019,386, issued to Morelock on Feb. 1, 2000 (hereinafter "the '386 patent"), describes another example of a receiver cover. The receiver cover of the '386 patent includes a pliable, resilient annular frame which is positionable around a receiver, with an end of the receiver protruding therethrough. The receiver cover of the '386 patent also includes a living hinge and jacket, which is configured to secure to the end of the receiver around which the frame is positioned. The jacket includes an exterior frame that is configured to be positioned around the outside of the receiver, as well as an extended perimeter, which is configured to be inserted into the receptacle of the receiver. As the receiver cover is formed from a pliable, resilient material, the exterior frame and extended perimeter may be stretched somewhat to secure the jacket to the end of the receiver. This configuration may, however, be somewhat undesirable since the jacket must be aligned with the end of the receiver before being installed thereon. Further, the jacket must be manually reinstalled on the end of the receiver following each use of the receiver.

Sometimes indicia, including the logos of car manufacturers or boat manufacturers, pictures, text, and indicia of various other types, are carried upon the outer members of known receiver covers. As is known in the art, however, it is difficult to secure and to maintain securement of indicia to pliable materials, especially those, like the material of the jacket of the receiver cover described in the '386 Patent, which may be subjected to repeated external stresses.

Accordingly, there is a need for a receiver cover which may be readily installed on an end of a receiver, which provides ready access to a receptacle of the receiver without requiring removal from the receiver, to which indicia may be reliably secured, and which automatically covers the receiver when the receiver is not in use.

SUMMARY OF THE INVENTION

The present invention includes receiver covers that are configured to be secured to the receiver of a trailer hitch, which receiver is permanently mounted to an automobile to adapt the automobile to haul trailers that may be coupled with the type of trailer hitch to, in turn, be coupled with the receiver. A receiver cover that incorporates teachings of the present invention is configured to be secured to the outside of a receiver so as to be positioned over the receptacle of the receiver. Such a receiver cover includes a stationary member, which secures the receiver cover to the receiver, a door, which may be positioned to cover the receptacle of the receiver when the trailer hitch is not in use (i.e., in a closed position) or to fully expose the receptacle of the receiver to facilitate coupling of a trailer hitch thereto (i.e., in an open position), and a hinge, which couples the stationary member and the door to one another and facilitates movement of the door between such closed and open positions.

The stationary member of a receiver cover of the present invention is configured to at least partially surround the outer periphery of the readily accessible end of a receiver, with which the trailer hitch may be coupled. When the stationary member is properly positioned on the receiver, the receptacle of the receiver is fully exposed through an access aperture of the stationary member. The hinge may be located at or near a periphery of the stationary member.

The door may comprise a generally planar member, which, when in a closed position, substantially covers the receptacle of a receiver on which the receiver cover has been positioned. The door may have an ornamental appearance or have an ornamental element secured thereto. The door may also include a latch, which is configured to at least temporarily secure the door in a closed position.

A receiver cover according to the present invention may also include a spring element which associates with the stationary member and the door in such a way as to bias the door from an open position to a closed position.

In use, a receiver cover that incorporates teachings of the present invention may be positioned on a receiver for a trailer hitch with the stationary member thereof securing the receiver cover in position and the door thereof covering the receptacle of the receiver. Until access to the receiver is desired, the door stays substantially in position without having to be introduced into the receptacle of the receiver. When access to the receptacle of the receiver is desired, for example, so that a trailer hitch may be coupled with the receiver, the door may be placed in an open position. The coupling end of a trailer hitch may then be inserted into the receptacle and coupled with the receiver, as known in the art (e.g., with one or more cotter pins). Once the trailer hitch is no longer needed, it may be uncoupled from the receiver and removed from the receiver's receptacle. The door may then be moved to a closed position, in which the receptacle of the receiver is substantially covered. Such movement may be manually effected or automatically effected by way of one or more springs.

Other features and advantages of the present invention will become apparent to those of skill in the art through consideration of the ensuing description, the accompanying drawings, and the appended claims.

BRIEF DESCRIPTION OF THE DRAWINGS

In the drawings, which depict various features of exemplary embodiments of the present invention.

DETAILED DESCRIPTION

Figure 1:
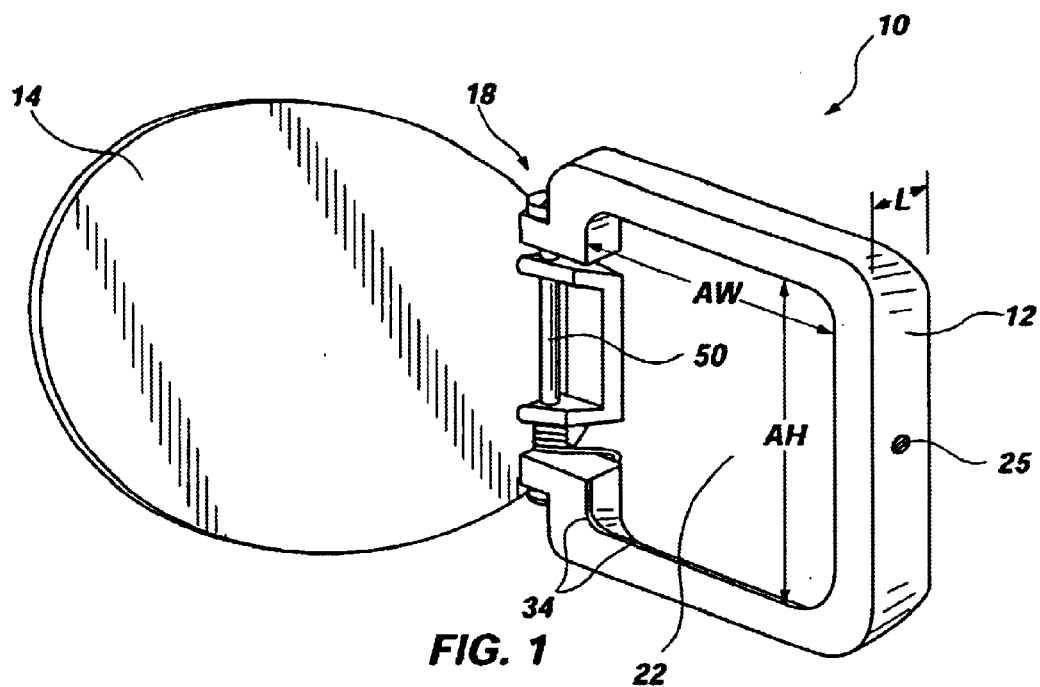
FIG. 1 is a frontal perspective view of a receiver cover that incorporates teachings of the present invention.

With reference to FIG. 1, an exemplary embodiment of a receiver cover 10 that incorporates teachings of the present invention is depicted. Receiver cover 10 includes a stationary member 12 and a door 14. Stationary member 12 and door 14 are coupled with one another by way of a hinge 18.

Figure 2:
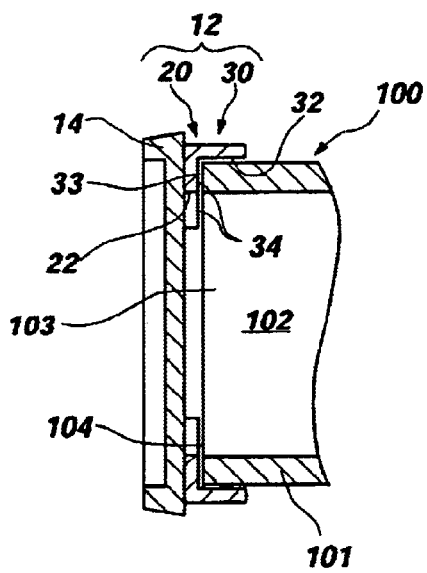
FIG. 2 is a cross-sectional representation of the receiver cover illustrated in FIG. 1, with the door thereof in a closed position.

As shown in FIG. 2, stationary member 12 includes a first end 20, to which hinge 18 couples door 14, and a second end 30, which is configured for coupling stationary member 12 to a receiver 100. An access aperture 22 formed through first end 20 of stationary member provides access to a receptacle 102 of receiver 100. Access aperture 22 is continuous with a receiver coupling aperture 32 of second end 30. As depicted, access aperture 22 may have internal dimensions (e.g., AH and AW (FIG. 1)), taken transverse to the length L (FIG. 1) of stationary member 12 that are smaller than the corresponding internal dimensions of receiver coupling aperture 32. As a result, a ridge 34 may be located at an interior end 33 of receiver coupling aperture 32, at the boundary between first end 20 and second end 30 of stationary member 12. Such a ridge 34 prevents stationary member 12 from sliding too far along the length of a receiver 100 and, thus, ensures that stationary member 12 will be properly positioned over and end 103 of receiver 100.

When assembled on a receiver 100, end 103 of receiver 100 is positioned within receiver coupling aperture 32, with an edge 104 of receiver 100 positioned proximate to or in abutment with ridge 34. In addition, access aperture 22 is continuous with receptacle 102 of receiver 100. Access aperture 22 and receptacle 102 may have substantially the same internal dimensions, as shown, to facilitate the insertion of a trailer hitch (not shown in FIG. 2) into access aperture 22, then into receptacle 102.

Figure 5:
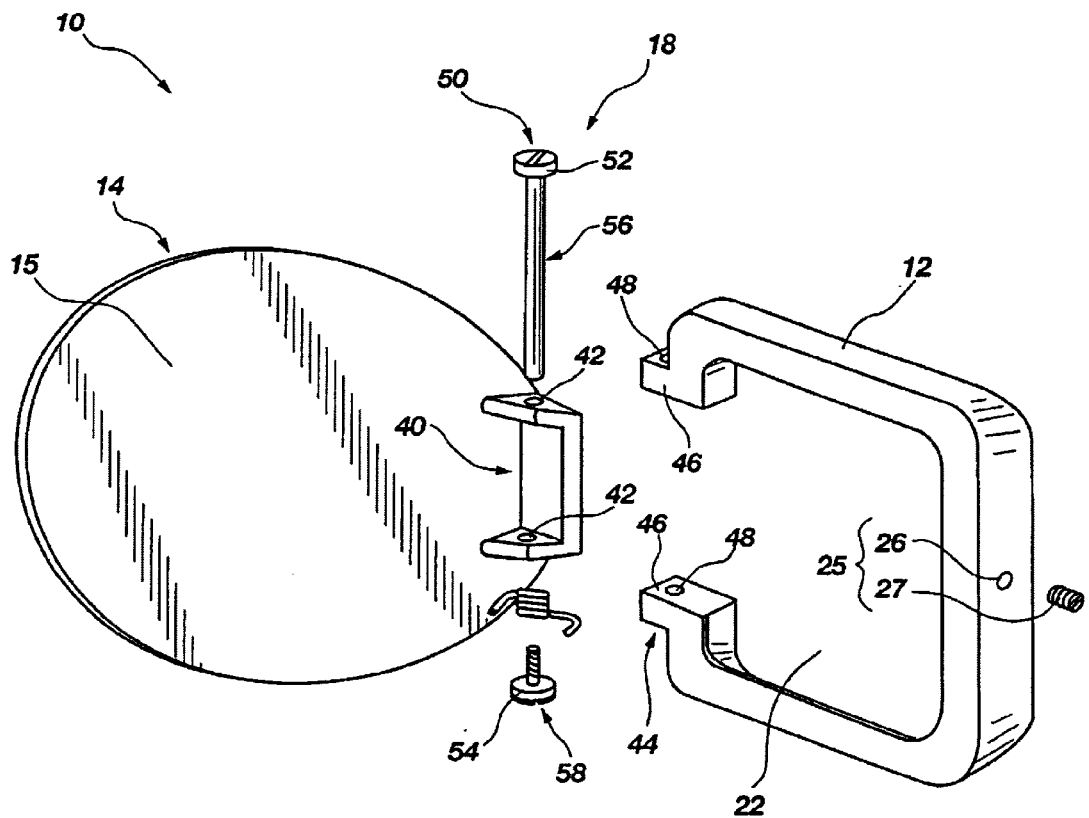
FIG. 5 is an assembly view of the receiver cover shown in FIGS. 1 through 4.

Stationary member 12 may additionally include one or more securing elements 25. As shown in FIG. 5, each securing element includes a threaded aperture 26 and a complementarily threaded securing screw 27. Aperture 26 extends completely through second end 30 of stationary member 12. Securing screw 27 is configured to be introduced in aperture 26 and tightened against an adjacent region of an exterior surface 101 of receiver 100 (FIG. 2) or received within an aperture or recess (not shown) which is continuous with exterior surface 101.

Figure 7:
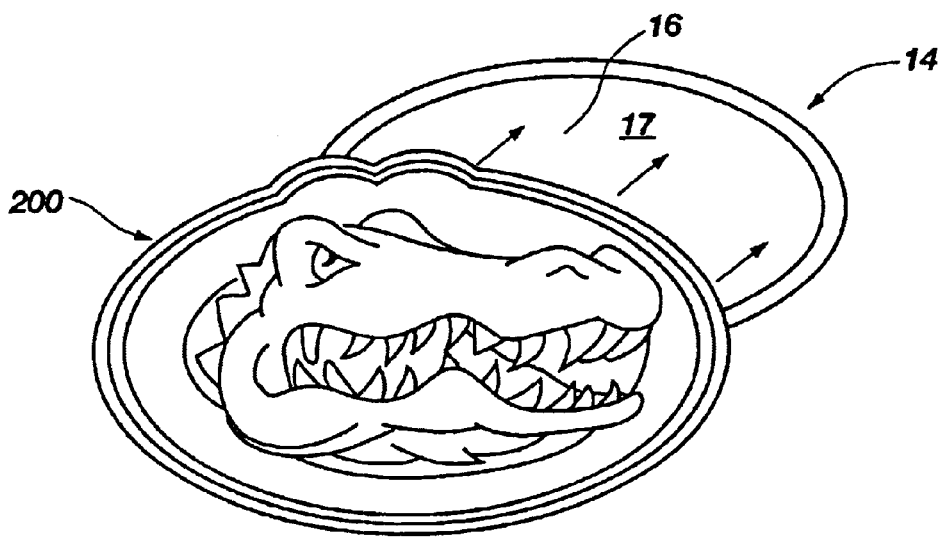
FIG. 7 illustrates an indicium installed onto an exterior surface of the door of the receiver member shown in FIGS. 1 through 6.

Door 14 may comprise a substantially planar member of virtually any shape and size, so long as the shape and size of door 14 are adequate for substantially covering access aperture 22 of stationary member 12 upon being positioned thereover. Although door 14 may be formed from any suitable material, including plastic, metal, rubber, or the like, it is currently preferred that door 14 be formed from a rigid material that facilitates securing of indicia 200 of various types (e.g., metal, plastic, etc.) to an exterior surface 16 thereof, as shown in FIG. 7. Such securing may, for example, be effected with suitable glues, cements, mechanical means (e.g., screws, pins, nuts and bolts, tabs and slots, etc.), or as otherwise known in the art. As best seen in FIG. 7, exterior surface 16 of door 14 may include a recessed area 17 which is configured to at least partially receive such indicia 200.

Figure 8:
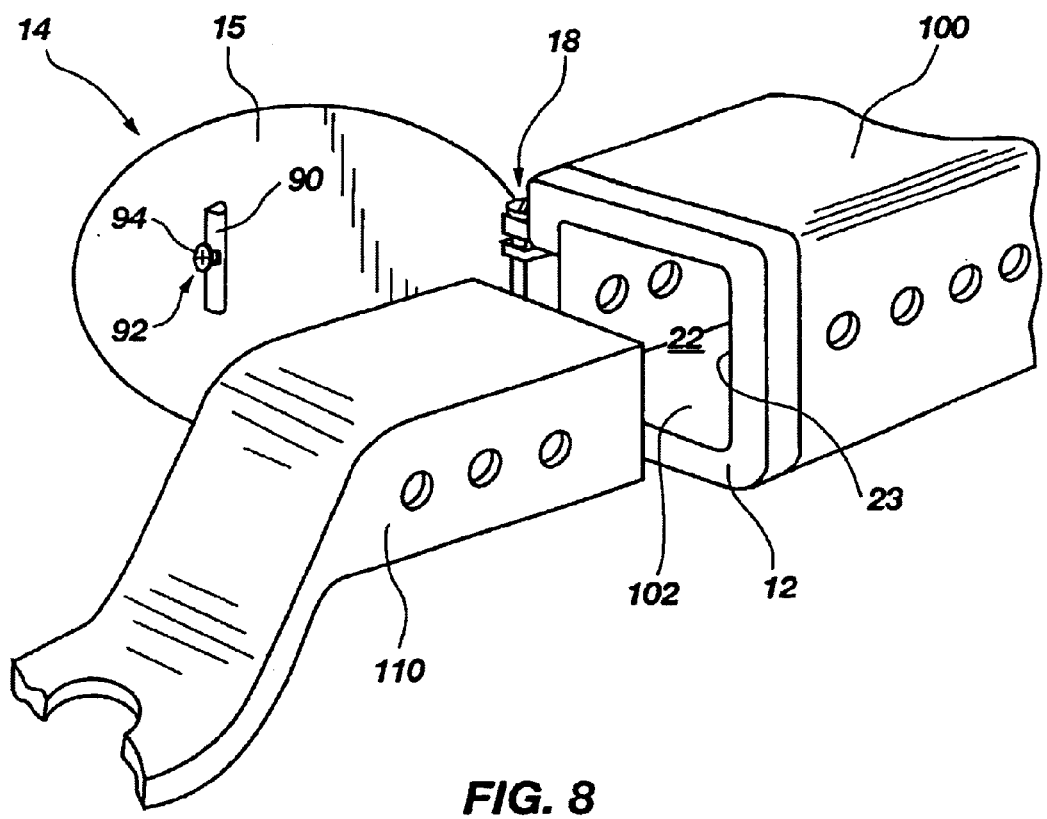
FIG. 8 depicts the door of the receiver cover shown in FIGS. 1 through 7 in an open position, as well as use of the receiver cover.

FIG. 8 depicts door 14 as including a wear reduction element 90 protruding from interior surface 15 thereof. As shown, wear reduction element 90 is an elongate element which protrudes from interior surface 15 of door 14 a sufficient distance that contact between door 14 and a trailer hitch 110 are minimized when trailer hitch 110 is coupled with receiver 100. Wear reduction element 90 may be located so as to be received by receptacle 102 of receiver 100 when door 14 is in the closed position.

Additionally, wear reduction element 90 may include a threaded aperture (not shown) which receives a set screw 92. An exposed head 94 of set screw 92 may be adjusted to a position at which it will contact an edge 23 of access aperture 22 when door 14 is in the closed position, minimizing vibration of door 14 and, thus, of receiver cover 10 when a vehicle with which receiver cover 10 is used is being driven. Set screw 92 may be adjusted outward to accommodate any wear to head 94 thereof or to edge 23 of access aperture 22 over time and, thus, so that such vibration of door 14 may be minimized following such wear. In the event that set screw 92 becomes too worn to prevent such vibration or gets lost, set screw 92 may be replaced.

Figure 3:
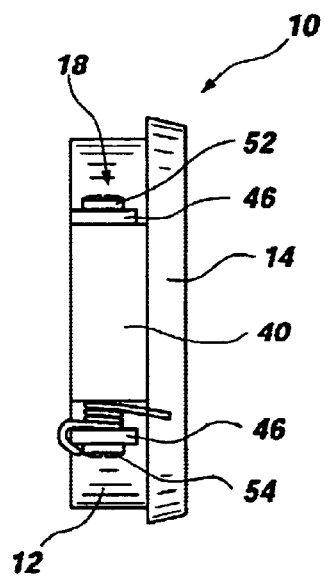
FIG. 3 is a first side view of the receiver cover of FIGS. 1 and 2.
Figure 4:
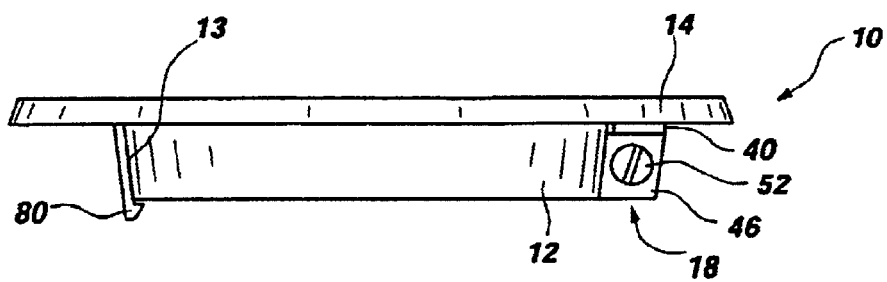
FIG. 4 is a top view of the receiver cover of FIGS. 1 through 3.

FIGS. 3 through 5 depict the elements of an exemplary hinge 18 for coupling door 14 to stationary member 12. Hinge 18 includes a first hinge member 40 which is integral with door 14 or is secured to an interior surface 15 thereof and which protrudes from interior surface 15. As shown, first hinge member 40 includes two apertures 42 which are in substantial alignment with one another. The depicted stationary member 12 of receiver cover 10 comprises a second hinge member 44 of hinge 18. Second hinge member 44 includes two coupling elements 46, each of which includes an aperture 48 formed therethrough. Like apertures 42, apertures 48 of coupling elements 46 are in substantial alignment. Coupling elements 46 are spaced a sufficient distance apart from one another that first hinge member 40 may be placed therebetween. Alternatively, a second hinge member may be secured to stationary member 12.

When door 14 and stationary member 12 are positioned properly relative to one another with first hinge member 40 and second hinge member 44 in an assembled relationship, apertures 42 of second hinge member 44 align with apertures 48 of first hinge member 40. A hinge pin 50, which extends through each of apertures 42 and 48, secures first hinge member 40 and second hinge member 44 to one another. Hinge pin 50 includes enlarged ends 52 and 54, which prevent hinge pin 50 from sliding out of apertures 42 and 48 and, thus, from becoming uncoupled from the remainder of hinge 18. As depicted, hinge pin 50 includes two members 56 and 58, each of which includes a single one of ends 52 and 54. Members 56 and 58 are securable to and removable from one another, such as by complementary threading, so as to facilitate introduction of hinge pin 50 through apertures 42 and 48 and, thus, assembly of hinge pin 50 with first hinge member 40 and second hinge member 44.

Although hinge 18 is shown as being positioned adjacent to a side of receiver cover 10, hinge 18 may alternatively be positioned adjacent to the top, bottom, or opposite side of receiver cover 10 and, thus, open in a different direction than that which is illustrated.

In any event, the features of hinge 18 are configured such that they do not interfere with the insertion of a trailer hitch (not shown in FIGS. 3 through 5) into receptacle 102 of receiver 100 (FIG. 2).

Moreover, although a particular embodiment of hinge 18 is depicted, other suitable hinge arrangements, as are within the ordinary skill of one in the art, are also within the scope of the present invention, including, without limitation, the use of so-called "living hinges", or one or more thinned regions of material at the location where stationary member 12 and door 14 are joined to one another.

Figure 6:
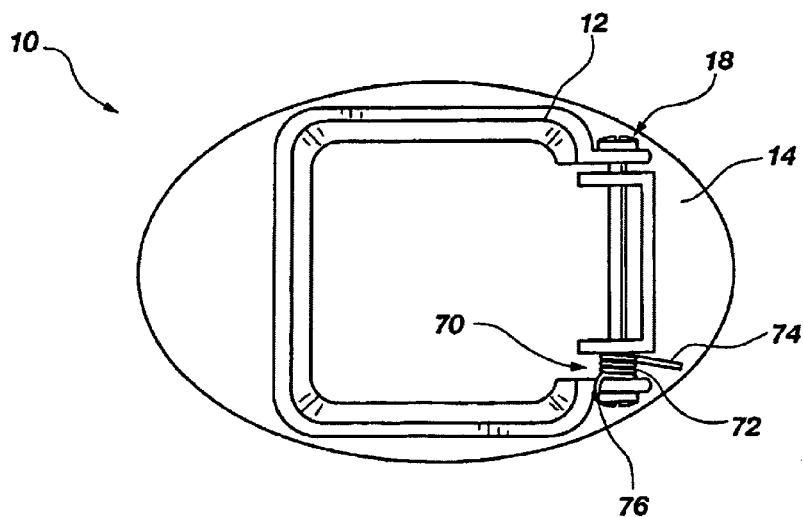
FIG. 6 is a rear view of the receiver cover depicted in FIGS. 1 through 5.

Referring now to FIG. 6, receiver cover 10 also includes a biasing element 70 which is associated with stationary member 12 and door 14 in such a way as to cause door 14 to be biased toward stationary member 12, or into a closed position. When used in conjunction with a door 14 that does not require precise alignment with an end 103 of a receiver 100 (FIG. 2), biasing element 70 facilitates the automatic covering of receptacle 102 of receiver 100 by door 14.

In the exemplary embodiment depicted in FIGS. 3 and 4, biasing element 70 comprises a coiled spring 72 which is positioned adjacent to or around a portion of hinge pin 50. Ends 74 and 76 of coiled spring 72 respectively abut stationary member 12 and door 14 in such a way that adjacent peripheral edges of stationary member 12 and door 14 which are located peripherally outside of hinge 18 are biased away from one another and, thus, the major portions of stationary member 12 and door 14, which are located on the opposite side of hinge 18, are biased toward one another. Ends 74 and 76 may be at least partially retained in position relative to stationary member 12 and door 14, respectively, by interference fit, by bends formed therein, or by way of retention notches (not shown) formed on opposing surfaces of stationary member 12 and door 14.

Of course, other types of biasing elements are also within the scope of the present invention, including other types of springs, magnets or magnetized elements, and the like.

Turning again to FIG. 4, door 14 may include a latch 80 which protrudes therefrom. Latch 80 is configured to engage a peripheral edge 13 or a corresponding feature on a peripheral edge 13 of stationary member 12. As shown, latch 80 is configured to be somewhat flexible so as to facilitate engagement and disengagement of stationary member 12 and, thus, temporarily retain door 14 in a closed position relative to stationary member 12.

A receiver cover that incorporates teachings of the present invention may optionally include a receptacle for an electrical harness, such as the 4-connection and 7-connection electrical plugs that are commonly used, as known in the art, to connect the electrical systems of trailers with those of the vehicles that are being used to haul such trailers.

Various elements of receiver cover 10, including, without limitation, stationary member 12, door 14, and hinge pin 50, may be fabricated by known manufacturing processes. By way of example only, known injection molding techniques may be used to form these and other elements of receiver cover 10 from a thermoplastic material or fiber-reinforced thermoplastic material. As another example, when metal is used to form one or more of the elements of a receiver cover that incorporates teachings of the present invention, known casting or machining processes may be used.

Referring again to FIGS. 1 and 2, as an example of the use of a receiver cover that incorporates teachings of the present invention, such as the depicted receiver cover 10, stationary member 12 may be positioned over an end 103 of a receiver 100, with end 103 being introduced into receiver coupling aperture 32 and abutting ridge 34. Securing screw 27 may then be tightened to secure stationary member 12 to receiver 100.

When access to receiver 100 is desired, as shown in FIG. 8, door 14 may be manually opened by pivoting the same about hinge 18. As door 14 is held in place so as to prevent biasing element 70 (FIG. 6) from moving door 14 back into the closed position over stationary member 12, a trailer hitch 110 is introduced into and coupled with receiver 100, as known in the art. Trailer hitch 110 then prevents biasing element 70 from closing door 14, so door 14 rests on trailer hitch 110.

Once trailer hitch 110 is no longer needed, it may be uncoupled from receiver 100 and removed from receptacle 102 of receiver 100 (See FIG. 2). Biasing element 70 (FIG. 6) may then cause door 14 to be biased toward stationary member 12 and, thus, moved into a closed position over access aperture 22 (FIG. 2) of stationary member 12 and receptacle 102 of receiver 100.

Although the foregoing description includes many specifics, these should not be construed as limiting the scope of the present invention, but merely as providing illustrations of some of the presently preferred embodiments. Similarly, other embodiments of the invention may be devised which do not depart from the spirit or scope of the present invention. Moreover, features from different embodiments of the invention may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed:
1. A receiver cover, comprising:
   a stationary member configured to be secured on an end of a receiver and including an access aperture through which a receptacle of the receiver is exposed and a ridge configured to abut an end of the receiver;
   a door positionable over said access aperture;

a hinge securing said door to said stationary member; and a biasing element for securing said door in position over said access aperture without requiring precise alignment of said door with said access aperture.

2. The receiver cover of claim 1, wherein at least said door is formed from a substantially rigid material to which indicia are readily securable.

3. The receiver cover of claim 1, further comprising:

at least one indicia-carrying element secured to an outer surface of said door.

4. The receiver cover of claim 1, wherein said biasing element comprises a spring which biases said door into a closed position over said stationary member and said access aperture thereof.

5. The receiver cover of claim 1, wherein said access aperture has substantially the same internal dimensions as the receptacle of the receiver on an end of which said stationary member is to be positioned.

6. The receiver cover of claim 1, further comprising:

at least one securing element associated with said stationary member for securing said stationary member to the receiver.

7. The receiver cover of claim 6, wherein said at least one securing element comprises a threaded aperture through said stationary member and a complementarily threaded screw insertable into said threaded aperture.

* * * * *

UNITED STATES PATENT AND TRADEMARK OFFICE
CERTIFICATE OF CORRECTION

PATENT NO. : 6,874,805 B2  Page 1 of 1
APPLICATION NO. : 10/236411
DATED : April 5, 2005
INVENTOR(S) : Wes Bagley It is certified that error appears in the above-identified patent and that said Letters Patent is hereby corrected as shown below:

In the specification:

| | | |
|---|---|---|
| COLUMN 1, | LINE 53, | change ""the '386 patent")," to -- "the '386 patent"),-- |
| COLUMN 1, | LINE 54, | change "the '386 patent" to --the '386 patent-- |
| COLUMN 1, | LINE 57, | change "the '386 patent" to --the '386 patent-- |
| COLUMN 2, | LINE 11, | change "the '386 Patent," to --the '386 Patent,-- |
| COLUMN 5, | LINE 47, | change "FIGS. 3 and 4," to --FIGS. 5 and 6,-- |

Signed and Sealed this

Sixth Day of November, 2007

JON W. DUDAS
*Director of the United States Patent and Trademark Office*